May 29, 1962     E. W. A. BECKER     3,036,891
PROCESS FOR THE PRODUCTION OF WATER OR HYDROGEN
HAVING AN INCREASED DEUTERIUM CONTENT
Filed Dec. 4, 1957
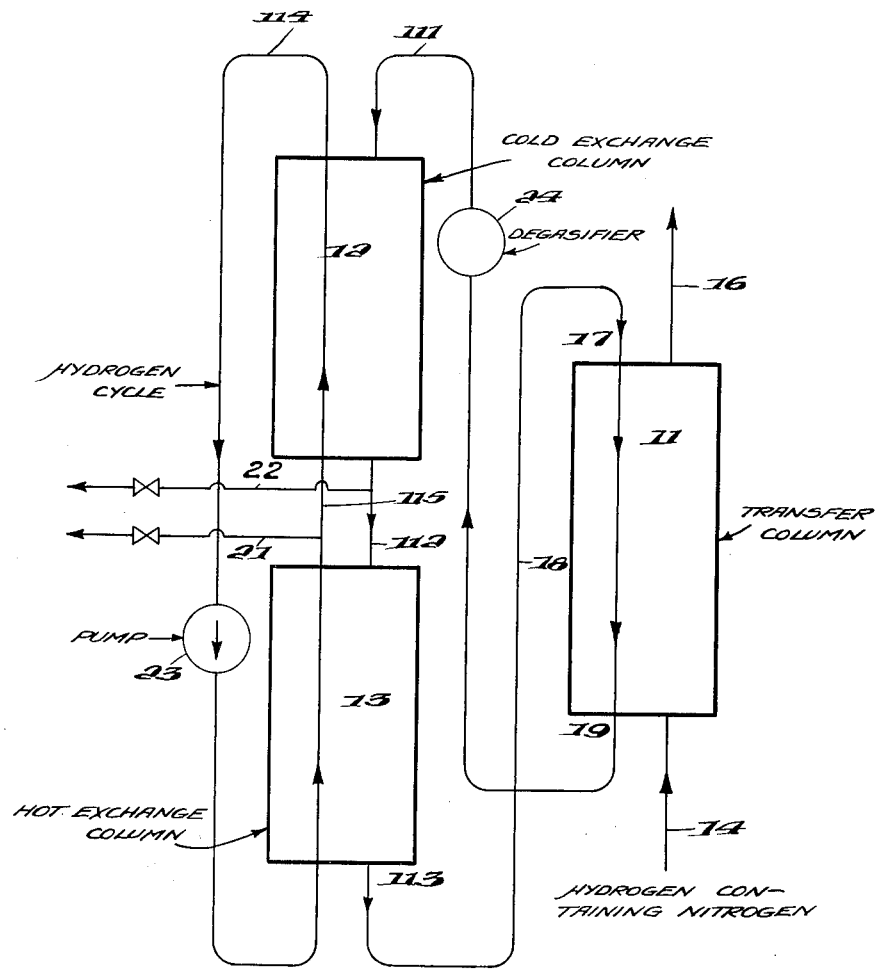
INVENTOR
ERWIN WILLY ALBERT BECKER,
BY
ATTORNEYS United States Patent Office 3,036,891
Patented May 29, 1962

3,036,891
PROCESS FOR THE PRODUCTION OF WATER OR HYDROGEN HAVING AN INCREASED DEUTERIUM CONTENT
Erwin Willy Albert Becker, 5 Renthof, Marburg (Lahn), Germany
Filed Dec. 4, 1957, Ser. No. 700,664
Claims priority, application Germany Dec. 8, 1956
3 Claims. (Cl. 23—204)

The present invention relates to an improvement in the process for production of water or hydrogen of increased deuterium content described in my co-pending application S.N. 531,980, filed September 1, 1955.

In such prior application the production of water or hydrogen enriched in deuterium is carried out through catalytic isotope exchange in a system of hot and cold columns. According to a preferred embodiment of such process, the catalyst is not fixed in such columns but is rather passed as an aqueous suspension or solution, for example, a sol, in a closed cycle together with the liquid through both columns or respectively through the further steps of the exchange plant. While this process leads to good results when hydrogen is available which contains no impurities which are deleterious to the catalyst, commercial hydrogen, depending upon its method of production, contains more or less nitrogen and the nitrogen content can, for example, lie between 2 and 20% and more. When such hydrogen in the presence of the catalyst reaches the hot column of the exchange system which is run at temperatures of about 200° C., formation of ammonia may occur at the catalyst or at the hot walls of + the apparatus and such ammonia gradually accumulates in the liquid leading to damage of the catalyst so that the exchange capacity of the system drops off considerably during operation.

It is the object of the present invention to avoid the aforementioned difficulties and disadvantages. It was found, according to the invention, that the provision of a further exchange column operating at relatively low temperatures which in the following will be designated as the "transfer column" renders it possible to carry out and control the exchange reaction in such a way that the formation of the deleterious ammonia in the hot column of the system and its accumulation in the system can be effectively avoided. According to the invention, the hydrogen containing nitrogen or other impurities deleterious to the activity of the catalyst is merely passed through the transfer column which operates at temperatures below 60° C., preferably below 45° C., countercurrent to water containing dissolved or suspended catalyst. The catalyst containing water is moved in a closed cycle so that after leaving the transfer column it is first passed through the cold column of the exchange system, then through the hot column of the exchange system and then back to the transfer column. In the presence of the catalyst an exchange of deuterium between the hydrogen and the water occurs in the transfer column in which the deuterium content in the water is increased by a factor of about 3 so that the water entering the actual exchange system consisting of a hot and cold column already is pre-enriched with deuterium. In addition, a closed hydrogen cycle is maintained between the hot and cold column of the exchange system. In view of the fact that in the process according to the invention water pre-enriched in deuterium is fed to the columns of the hot-cold system, it is not necessary to increase the volume of the columns of such system. The process according to the invention therefore renders it possible to use nitrogen and other impurities containing hydrogen as a feed for the recovery of deuterium without danger of damage to the catalyst and without the necessity of increasing the cost of the exchange plant.

In a preferred embodiment according to the invention a degasifier, such as, for example, a decompression pump, can be provided in the water cycle between the transfer column and the cold column of the exchange system so that any residues of nitrogen and other impurities which might still be dissolved in the water are removed therefrom.

The accompanying drawing diagrammatically shows an apparatus suitable for carrying out the process according to the invention.

In such drawing, 11 is the transfer column which is operated at a temperature of about 20° C., 12 the cold column of the exchange system which is operated at a temperature of about 20° C. and 13 the hot column of the exchange system which is operated at 200° C. Hydrogen which, for example, contains nitrogen as an impurity is introduced into the bottom of transfer column 11 over line 14 and after passing through the column is withdrawn at the top of such column through conduit 16. Water containing 1% of platinum in the form of a sol as the catalyst is introduced over conduit 18 at 17 into the head of the transfer column and leaves the bottom of such column at 19 and is then passed over conduit 111 to the cold column 12. After passing through the cold column it is supplied to hot column 13 over conduit 112. After leaving the bottom of column 13 at 113, it is cycled back to the transfer column over line 18. A cycle of pure hydrogen is maintained through the hot and cold columns with the aid of conduits 114 and 115 and pump 23. Preferably, a degasifier 24 is provided in line 111 between the transfer column and the cold column to entrain any nitrogen dissolved in the water leaving the transfer column before it is supplied to the hot-cold exchange system. If the product desired is water enriched in deuterium this can be bled off conduit 112 through conduit 21. Of course, with suitable removal of the platinum contained therein and suitable replenishment of water and platinum in the water cycle. If the product desired is hydrogen enriched in deuterium, this can be bled off conduit 115 through conduit 22, again of course with suitable replenishment of the hydrogen in the pure hydrogen cycle.

The isotope exchange reactions are carried out in the columns under elevated pressures of at least 10 atmospheres gauge as described in my co-pending application S.N. 531,980.

I claim:
1. In a method for increasing the deuterium content in a deuterium containing substance selected from the group consisting of molecular hydrogen and water in an exchange system under pressure in which streams of molecular hydrogen and liquid water are passed in deuterium exchanging relation in the presence of an exchange catalyst countercurrent to each other serially through two columns maintained at different temperatures, the liquid water first passing through the column maintained at the lower temperature and then passing through the column maintained at the higher temperature and the hydrogen first passing through the column maintained at the higher temperature and then passing through the column maintained at the lower temperature and a deuterium containing substance selected from the group consisting of hydrogen and water enriched in deuterium is withdrawn from one of the streams at a point between the two columns, the water passing through such columns carrying the exchange catalyst along in disperse phase, and in which deuterium containing hydrogen containing nitrogen as an impurity is employed as a feed of deuterium to the exchange system, the steps which comprise passing the water containing the exchange catalyst in disperse phase after having passed through the hot column through a transfer column maintained at a temperature below 60° C., while passing the hydrogen containing the nitrogen through said transfer column counter-current thereto and passing the water leaving the transfer column together with the catalyst in a cycle through the cold column and then through the hot column of the exchange system and then back to the transfer column.

2. The process of claim 1 in which said transfer column is maintained at a temperature below 45° C.

3. The process of claim 1 in which the pressure of the water leaving the transfer column is reduced to remove dissolved gases in said water before it is passed into the cold column of the exchange system.

References Cited in the file of this patent

UNITED STATES PATENTS

| | | |
|---|---|---|
| 2,690,379 | Urey et al. | Sept. 28, 1954 |
| 2,741,543 | Urey | Apr. 10, 1956 |
| 2,787,526 | Spevack | Apr. 2, 1957 |
| 2,908,554 | Hoogshagen | Oct. 13, 1959 |

FOREIGN PATENTS

| | | |
|---|---|---|
| 1,138,776 | France | Feb. 4, 1957 |
| 90,108 | Norway | Aug. 10, 1957 |

OTHER REFERENCES

Benedict: "Proceedings of the International Conference on the Peaceful Uses of Atomic Energy," pages 399–401, vol. 8, United Nations, New York, August 1955.

Becker: "Angew. Chem.," 68, 6–13 (1956).